United States Patent

[11] 3,584,882

[72] Inventors George F. Krtous
Chicago;
Carl G. Schreyer, Highland Park, both of, Ill.
[21] Appl. No. 837,383
[22] Filed June 30, 1969
[45] Patented June 15, 1971
[73] Assignee Bell & Howell Company
Chicago, Ill.

[54] VERTICAL RECORD CARD ADAPTER FOR RECORD TAPE MACHINE
14 Claims, 10 Drawing Figs.

[52] U.S. Cl. .................... 274/4J, 35/35C
[51] Int. Cl. .................... G11b 5/00
[50] Field of Search .................... 179/100.2 T; 274/42, 4 C,E; 35/35 C

[56] References Cited

UNITED STATES PATENTS

| | | | |
|---|---|---|---|
| 2,849,542 | 8/1958 | MacChesney | 179/100.2 |
| 2,677,200 | 5/1954 | MacChesney | 35/35 |
| 3,037,093 | 5/1962 | Nowlan | 179/100.2 (T) |
| 3,348,320 | 10/1967 | Brokaw | 35/35 (C) |
| 3,404,894 | 10/1968 | Kral | 274/4 (.2) |
| 3,488,058 | 1/1970 | Staar | 274/4 (E) |
| 3,488,867 | 1/1970 | Lyon | 274/4 (.2) |

*Primary Examiner*—Leonard Forman
*Assistant Examiner*—Dennis A. Dearing
*Attorney*—William F. Pinsak

ABSTRACT: A vertical record card can be held at selected levels in sound recording or reproduction association with a recorder-player adapted for cassette contained record tape.

Inventors:
George F. Krtous,
Carl G. Schreyer.

By William [signature]

Atty

Inventors:
George F. Krtous,
Carl G. Schreyer.
By William [signature]
Atty

Inventors:
George F. Krtous,
Carl G. Schreyer.
By William F. [illegible] Atty

VERTICAL RECORD CARD ADAPTER FOR RECORD TAPE MACHINE

The present invention relates to sound producing and recording apparatus. Particularly, the invention relates to means for enabling a record machine, of the type adapted for sound reproduction from and recording on cassette contained record tape, to operably manage vertical record carriers or cards.

Conventionally vertical record carriers or cards are used as educational tools. To that end, a card has a pair of parallel strips of magnetic medium adapted for horizontal orientation when used. One strip is an instructional control, the other being for erasably recording student attempts.

Customary recorder-players for handling record cards are exemplified in U.S. patents to MacChesney, Nos. 2,603,006, 2,677,200 and 2,849,542. These are not adapted to record on or reproduce sound from record carriers of other physical forms, such as tape. The special utility of prior recorder-players has tended to limit use of educational programs on vertical record cards.

It is an object of this invention to maximize employment of vertical record cards. To that end, an adapter is provided which enables a record machine with means for driving a cassette contained tape into intelligence transfer with an electromagnetic transducer, to manage a card carrier for records having parallel strips of magnetic recording medium. The adapter comprises a casing having a track for supporting a card carrier in a vertical aspect; and is fashioned for releasable connection adjacent the transducer of the record machine. Means associated with the adapter enable selective adjustment of a card carrier between a first condition in which a first carrier strip is registered with the transducer and a second condition in which a second carrier strip is registered with the transducer. Openings in the track enable reception of the driving means of the record machine for moving the card carrier in the track in operative association with said transducer.

Figures 1, 2, 3:
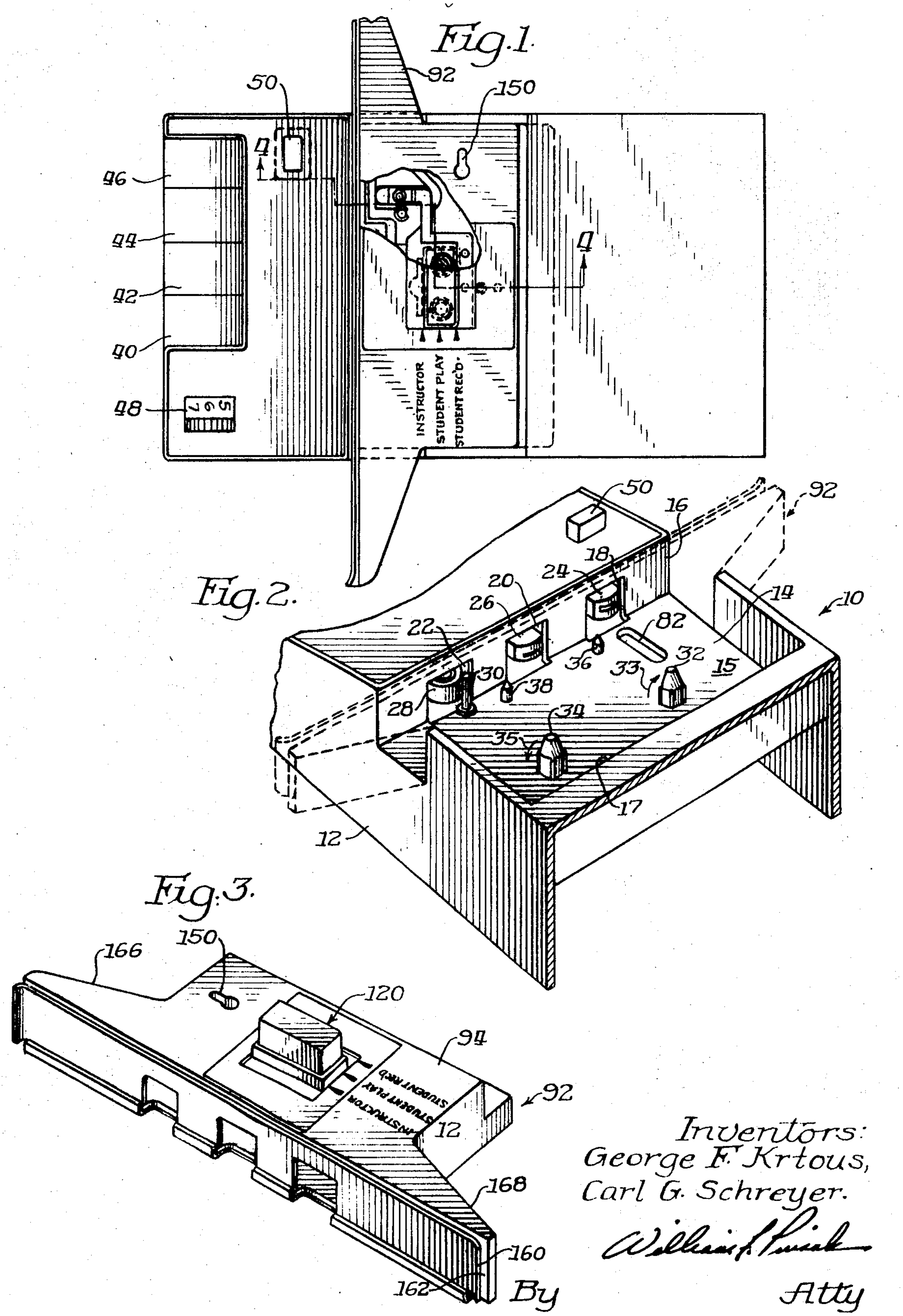
FIG. 1 is a top plan view of an adapter embodying the invention mounted on a recorder-player machine, parts of the adapter being broken away.
FIG. 2 is a perspective view of a portion of said machine, the adapter shown in dashed lines.
FIG. 3 is a perspective view of the adapter.
Figures 5, 6, 7, 10:
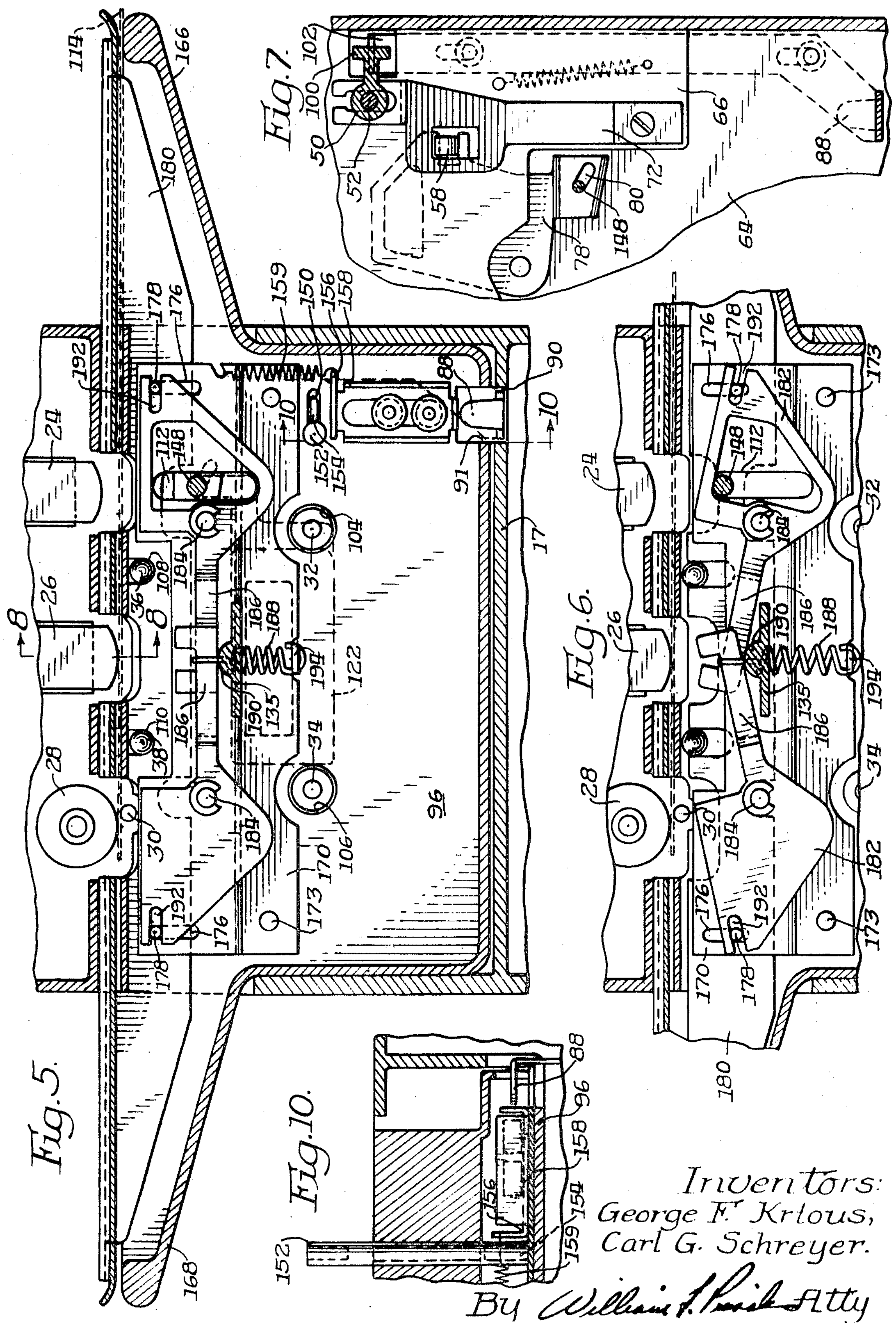
FIG. 5 is a view in a horizontal plane according to section line 5—5 of FIG. 4.
FIG. 6 is a view similar to FIG. 5, however, showing parts alternately conditioned.
FIG. 7 is a view according to the broken section line 7—7 on FIG. 4 and projected in a horizontal plane.
FIG. 10 is a detailed view according to section line 10—10 on FIG. 5.

Referring now more particularly to FIGS. 1 and 2, a recorder-player machine 10 for record tapes of the type which are contained in a cassette (not shown) may be conventional, except where noted to the contrary, and comprises a housing 12. An upwardly opening well 14 fashioned in the medial portion of the housing is defined by a deck 15, a forward wall 16 and a rear wall 17 (FIG. 5). A plurality of aligned windows, or openings, 18, 20 and 22, respectively, expose an electromagnetic erase head 24, an electromagnetic reproducing-recording head 26, and a pinch roller 28. A drivable capstan 30 projects upwardly from deck 15 adjacent window 22 in operative alignment with pinch roller 28 adjacent, though slightly spaced from, forward wall 16.

A pair of laterally spaced-apart reel drive shafts 32 and 34 project upwardly through deck 15 into the well 14 and are adapted for releasably receiving a pair of cassette contained reels (not shown). Shaft 34 is arranged to provide torque to one of the reels for normal tape takeup in the direction of arrow 35, whereas shaft 32 is adapted to provide tape rewind torque to the other reel in the direction of arrow 33. A pair of locating pins 36 and 38 project upwardly from floor 15 for holding a cassette with its tape suitably registered between the capstan and the pinch roller for management in housing 12.

A customary depressable button 40 is arranged on machine 10 for energizing a circuit (not shown) to move head 26 and pinch roller 28 into operable positions in their respective openings, as well as for conditioning the machine for sound reproduction through head 26 and for actuating shaft 34 for normal tape takeup. A fast forward button 42 is mounted adjacent button 40 and is depressably arranged to actuate a circuit (not shown) for rapidly driving shaft 34 to enable fast tape takeup. A depressable rewind button 44 is arranged for energizing a circuit (not shown) for driving shaft 32. Another depressable stop button 46 is arranged on housing 12 for deenergizing any therefor energized circuits in machine 10 and to restore heads 24 and 26 and pinch roller 28, if operatively conditioned, to an inoperative condition. Moreover, machine 10 has a customary volume selector 48 which is rotationally mounted in casing 12 to control a conventional circuit (not shown).

A depressable record button 50 (FIGS. 1, 4 and 5) is mounted for reciprocation on a fixed post 52 which projects upwardly through casing 12. It has an elongated spline 100 (FIG. 7) slideably arranged in bearing 102. Button 50 is arranged to control switch 56 (FIG. 4) having an arm 58 which projects upwardly through a slot 61 in a fixed chassis member of plate 64 and a slot 62 in a plate 66. The latter is shiftably supported on bearing means 65 within housing 12 above plate 64. Arm 58 is arranged for clockwise movement with respect to FIG. 4 about a pivot 60 in response to depression of said button to operate switch 56 which is normally in an "off" condition. However, when the button is depressed, the switch moves to an "on" condition in which a circuit is energized enabling recording through head 26 while simultaneously a circuit in erase head 24 is energized and a circuit for sound reproduction through head 26 is deenergized.

Button 50 is normally held in projected position by an upwardly directed extension 86 of arm 84 comprising releasable button holding means. Spring 87 having an end anchored to said arm, and an opposite end secured on fixed frame part 89, urges extension 86 to button holding condition. This arrangement prevents accidental depression of button 50, in which circumstance a commercial recording could be damaged. However, arm 84 has a control extension 88 which projects into well 14 through opening 90 in casing wall 17.

The parts are arranged and proportioned in a manner such that when extension 88 is pushed into housing 12 through aperture 90, extension 86 will be withdrawn from holding condition enabling button 50 to be depressed against the action of spring 72 which normally urges said button to a projected condition. Extension 88 is proportioned so that it will be pushed out of well 14 by mounting therein a conventional cassette carrying a tape intended for recording.

To the latter end, spring 72 has a button engaging bent upper section 76 and an anchored lower end portion 77 which is rigidly secured to plate 66 below section 76 by fastening means 75. The parts are arranged and proportioned in a manner such that when spring section 76 is depressed, upon depression of button 50, plate 66 will be shifted and draw arm 58 to condition switch 56 for recording. Simultaneously, arm 58 will register with and move through a slot 74 in downwardly moving spring 72. A hook 59 on upper end portion of arm 58 is fashioned and proportioned to enable spring 72 to cam over it as the spring moves downwardly, yet engage the margin of slot 74 to hold spring 72 in its active or plate shifted condition and said record button 50 depressed.

Figure 4:
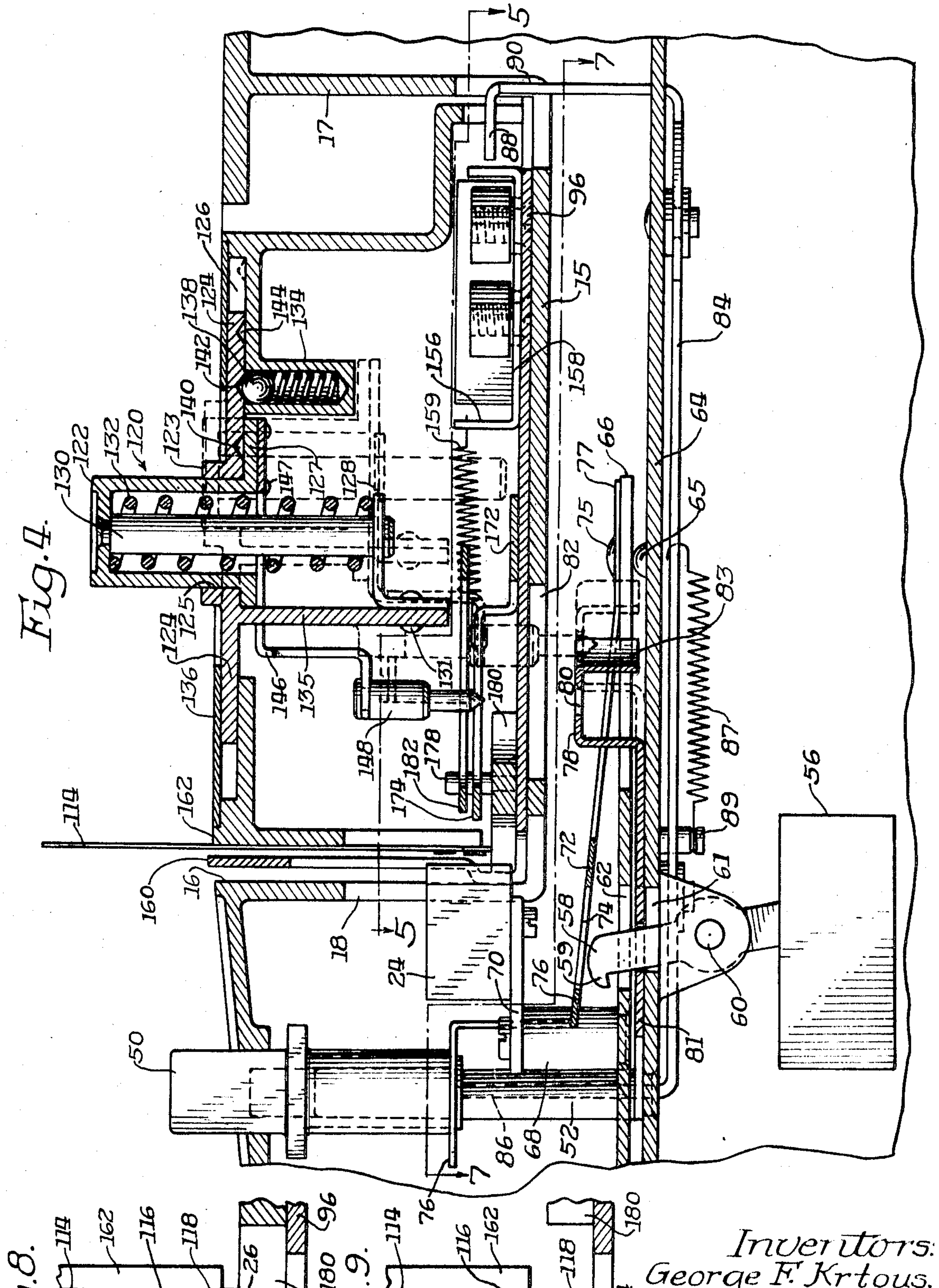
FIG. 4 is a view according to broken section line 4—4 on FIG. 1 and projected in a vertical plane, an alternative position of elements being shown in dashed lines.

When plate 66 is thusly shifted, erase head 24 will be shifted from its position of FIG. 4 to an operative position in which it is projected through window 18. This results from movement of shelf 70 within the housing upon which head 24 is carried. The shelf itself is movable because it is carried on a vertical post 68 which is rigidly secured to an projects upwardly from plate 66.

Switch 56 may also be operated independently of record button 50 through the agency of auxiliary switch actuating means comprised of a link 78 (FIGS. 4 and 7) and having a slotted portion 81 through which arm 58 projects. Link 78 has an upwardly offset U-shaped portion 83 with an opening or aperture 80 which is aligned with a slot 82 (FIG. 2) in deck 15. Neither link 78 nor slot 82 is conventional.

Link 78 is slideably disposed between plate 66 and plate 64 for movement between a first condition (solid line of FIG. 4) in which switch 56 is "off" and a second condition (dashed line of FIG. 4) in which said switch is "on." Motivation of said auxiliary switch actuating means may be through any convenient tool proportioned to be projected through slot 82 into slot 80.

An adapted assembly 92 (FIGS. 1, 2 and 3) comprises a casing 94 having a base 96 (FIGS. 4 and 5). Adapter 92 is proportioned for reception in well 14 and its base has a pair of holes 104 and 106 (FIG. 5) adapted to accommodate reel drive spindles 32 and 34, and a pair of holes 108 and 110 proportioned for receiving locating pins 36 and 38 for fixing the adapter in a desired position in well 14. Said base also has a slot 112 (FIG. 5) which is disposed for alignment or registration with slots 80 and 82 in base 14 and link 78, respectively. A slot 91 (FIG. 5) in the rear wall 93 of casing 94 is adapted to accommodate extension 88 in an untensioned condition.

The adapter is for enabling machine 10 to handle record carriers of the type exemplified by a card 114. Such carrier may be employed for instructional purposes and to that end, card 114 has a pair of parallel tracks of strips of magnetic medium 116 and 118 which will adopt a horizontal aspect when the card is oriented in operable or vertical condition on machine 10. Strip 116 in the exemplary embodiment is the INSTRUCTOR strip and strip 118 in the STUDENT strip.

For enabling suitable handling of the card, the adapter has a pair of slightly spaced-apart parallel walls 160 and 162 (FIGS. 8 and 9) which are adapted for vertical orientation. Wall 162 is shown fashioned integrally with casing 94 and wall 160 comprises an extension which has been turned or bent as substantially 90° from base 96. Said walls define a track 164 (FIGS. 9 and 10) for holding said card vertically oriented. Moreover, for supporting a card so that it will not fall from the track while intelligence is being transferred, the adapter has a pair of forward wings 166 and 168 having track extension which project beyond the sidewalls of casing 94 through appropriate slots therein (FIG. 2). The parts are arranged and proportioned so that when the adapter is mounted on machine 10 and card 114 is mounted in track 164, the card will be disposed in driveable engagement with capstan 30, with a selected of strips 116 and 118 aligned for operable association with transducer heads 24 and 26. Carrier adjusting means 120 for strip selection includes a card shifter 180 in the form of an elongated platform for elevating and lowering the card.

Management of the carrier adjusting means is exercised through a manually operable member or button 122 (FIG. 3) which projects outwardly from casing 94. The button may be moved forwardly and backwardly to selected of first, second and third stations, the first station (labeled STUDENT PLAY) being disposed between the second station (labeled STUDENT RECORD) and the third station (labeled INSTRUCTOR).

To enable movement of button 122 between its three stations it is constrained for movement with a bearing member 123, through a bearing opening 125 in which said button is reciprocative. An outwardly extending bearing flange 124 is slideable in an upwardly opening recess 126 in casing 94 in which said flange is retained by means of a recess cover 136. Flange 124 has three downwardly facing notches 140, 142 and 144 corresponding to the second, first and third button stations, respectively. The notches are proportioned for reception of a spring urged ball detent 138 for releasably holding said button at selected of said stations.

A spring 132 having an upper end portion mounted within button 122 normally urges the latter to a projected condition from casing 94. In such condition, the button is prevented for sliding to its second station by an abutment 134 which herein defines a well within which the spring of detent 138 is mounted and which is fixed in the path of a flange 127 integral with said button.

However, button 122 is secured to the upper end of a vertical post 130 about which spring 132 is mounted. The post, in turn, is reciprocative through an opening in a table 128 which is rigidly secured by suitable fasteners 131 to a downwardly extending projection or wall 135 carried from bearing 123 and against which the lower end of spring 132 bears. Although well 134 has a depending aspect, it is proportioned so that it may be cleared by flange 127 when button 122 is manually depressed to enable the button to be slid to its second station. Thereafter, upon release of manual force, the button will be maintained in a depressed condition by latching engagement of the well bottom with flange 127.

A bracket 146 (FIG. 4) is rigidly secured to button 122 by suitable fasteners 147 which secure an end of said bracket to flange 127. A downwardly projecting pin 148 is secured from said bracket in alignment with apertures or slots 80, 82 and 112. The parts are proportioned in a manner such that upon depression of button 122 sufficient to enable its movement to its second station, pin 148 will pass through slots 82 and 112 and engage in aperture 80. Accordingly, as the button is moved from its first station (solid line of FIG. 4) to its second station (dashed line of FIG. 4), link 78 will move switch arm 58 to change the condition of switch 56 from "Off" to "On" and enable recording.

A lug 190 (FIG. 5) which is integral with an extends longitudinally of projection 135 is arranged for actuating a pair of levers 182. The latter members are symmetrically arranged within casing 94 for rocking movement about a pair of spaced-apart pivots 184 which project upwardly from a fixed plate 170. A rear portion 172 (FIG. 4) of said plate is secured to base 96 by rivets or the like 173.

Shifter 180 is slidably mounted on base 96 under a forward and upwardly offset portion 174 and plate 170, and carries a pair of upwardly projecting laterally spaced-apart pins 178. These are slidably engaged in a pair of slots 176 in said plate and are proportioned in a manner such that they pivotally engage in a pair of recesses 192 fashioned in the outer ends of levers 182. Slots 176 are proportioned for sliding movement of pins 178 between front and back positions, thereby to move the shifter between a card support condition (FIG. 8) in which STUDENT strip 118 is operatively aligned with heads 24 and 26, and a withdrawn condition (FIG. 9) in which INSTRUCTOR strip 116 is in operative association with said heads.

Figure 8:
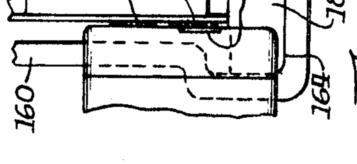
FIG. 8 is a detailed view according to section line 8—8 of FIG. 5.
Figure 9:
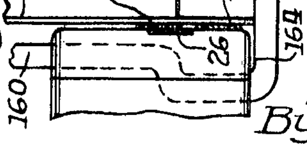
FIG. 9 is similar to FIG. 8, however, showing parts conditioned as in FIG. 6.

Levers 182 have inner end portions 186 which are disposed in front of wall 135 and anchored to one end of an expansion spring 188. The opposite end of said expansion spring is secured to a fixed part for holding levers 182 in a normal condition in which shifter 180 is disposed in its support condition (FIG. 8). Lug 190 is proportioned so that it will engage lever inner end portions 186 when button 122 is in its first station without tensioning spring 188. In consequence, while the bottom is at its first station, and when the button is moved from its first to its second stations (rearwardly), shifter 180 will be conditioned for supporting card 114. As button 122 is moved from its first to its third condition (forwardly), lug 190 will rock levers 182 against the tension of spring 188, from the condition of FIG. 5 to the condition of FIG. 6 and accordingly move the shifter to a nonsupport condition.

It is intended that a student should not be able to alter intelligence which has been recorded on INSTRUCTOR strip 116. However, alternation of intelligence may be required. To that end, means for actuating switch 56 independently of button 122 comprises a key 152, which is intended to be in possession of an instructor and is removably mountable in a keyhole 150 in casing 94. An arm 158 (FIGS. 5 and 10) is slideably mounted on base 96 in alignment with extension 88 for moving arm 85 to release record button 50. An expansion spring 159 normally draws arm 158 to a condition in which it is disengaged from extension 88. However, key 152 has a lug 154 which is proportioned for engaging an extension 156 of arm 158 and urging said arm, against the action of spring 159, into button releasing engagement with said extension 88. Accordingly, upon rotation of the key, clockwise from the condition of FIG. 5, toward a position 90° therefrom, switch 56 may be actuated to permit recording upon depression of record button 50.

The foregoing arrangement enables a student to record intelligence in magnetic medium of strip 118 and play back such record while the card 114 is elevated, that is to say, while carrier adjusting means 120 is disposed at its second and first stations, respectively. However, without key 152, intelligence in track 116 cannot be tampered with. This arrangement provides an advantage over prior art recorder-players for verticals records with which intelligence in an instruction track, either through inadvertence or design, can be modified without authorization.

We claim:

1. An adapter for enabling a sound recorder-reproducing machine, having a deck surface which defines a cassette receiving station and also having means for driving the record tape in a cassette mounted thereon into intelligence transfer association with an electromagnetic transducer adjacent said driving means, to handle a record card having parallel tracks of magnetic recording medium, said adapter comprising:

a casing, mountable to said cassette receiving station, having a track forming a substantially linear path for guiding a record card mounted therein; track condition means associated with said casing for selectively transversely adjusting a record card mounted in said casing track between a first condition in which a first recording track is registered with said transducer and a second condition in which a second recording track is registered with said transducer;

said casing track, when said casing is mounted on said machine, being aligned with said drive means and said transducer and having openings therein for receiving said drive means and said transducer permitting said drive means to move a record card in said casing track in an operative association with said transducer.

2. An adapter according to claim 1 in which said carrier adjusting means comprises:

A carrier shifter arranged in said casing, for movement between a first aspect to support said first track in registration with said transducer and another aspect in which said second track in registration with said transducer; and a manual member movable between a first station and another station and coupled to said shifter for moving said carrier shifter for a position external said housing.

3. An adapter according to claim 2 in which said carrier shifter is a platform arranged to move in a horizontal plane for supporting a carrier in vertical orientation at a horizontal level in which the lowermost of said recording tracks registers with said transducer.

4. An adapter according to claim 2 in which said annual member is arranged for movement between said first station and a second station for enabling recording through said transducer on one of said recording tracks while said shifter is disposed in said first aspect, and characterized by means arranged for movement through said casing in response to said manual member for actuating a recording switch on said machine as said manual member is moved to said second aspect.

5. An adapter according to claim 4 further characterized by means for limiting movement of said actuating means when said manual member is moved to said second station.

6. An adapter according to claim 4 characterized by means for permitting actuation of a record switch on said machine.

7. An adapter according to claim 3 wherein the manual member is mounted for reciprocation through said casing between a depressed and an extended condition and characterized by a spring urging said member to said extended condition, an abutment arranged in a casing for preventing movement of said member to said second station while in said extended condition.

8. An adapter according to claim 7 wherein the abutment is proportioned to enable movement of said member from said first to said second station when said member is in said depressed condition.

9. An adapter to claim 7 characterized by:

coupling in comprising a pair of rockable levers movable between a normal position in which said shifter is disposed in one of its aspects and a second condition in which said shifter is disposed in its other aspect and arranged in the path of movement of said manual member; and a pair of pins connecting said levers and said platform responsive to the condition of said manual member for moving said shifter.

10. A combination according to claim 9 in which said platform is arranged for movement onto and off of said track.

11. A recording-reproducing machine for sound records in a magnetic medium and comprising:

a body having opposed sides an an upwardly opening well for optionally receiving a tape cassette therein;

a casing releasably retained in said well and having a track aligned along one side of said well for supporting a vertical record card;

a pair of spindles arranged in said well for supporting a cassette containing a pair of reels of record tape when said casing is out of said well;

said casing including means for accommodating said spindles when said casing is disposed in said well;

drive means located in said well adjacent said one side for optionally driving either a tape in a cassette mounted in said well or driving a record card supported in said casing when said casing is mounted in said well;

an electromagnetic transducer means located adjacent said one side of either intelligence transfer to and from a record card in said track or to and from a cassette tape;

means located in said well adjacent said one side for either erasing a record in the medium on said card or a tape in a cassette;

first switch means for manually conditioning said machine for sound reproduction through said transducer means;

second switch means for conditioning said machine for recording through said transducer means;

means associated with said body of normally disabling operation of said switch means; and means on said casing for manually overcoming said disabling means.

12. A combination according to claim 11 in which the casing has opposed extensions projecting beyond said body for extending said supporting track beyond said sides.

13. A combination according to claim 11 in which the machine is characterized by a pair of pins arranged in said well for registering cassette contained record tape when said transducer means and said erasing means.

14. A combination according to claim 11 wherein said second switch means comprises a recording switch in said body and a manually operative member projecting from said body for operating said recording switch and normally disposed in a disabled condition, and further characterized by means associated with said casing for operating said recording switch independently of said manually operative member.

UNITED STATES PATENT OFFICE

CERTIFICATE OF CORRECTION

Patent No. 3,584,882 Dated June 15, 1971

Inventor(s) George F. Krtous and Carl G. Schreyer

It is certified that error appears in the above-identified patent and that said Letters Patent are hereby corrected as shown below:

Claim 1, line 36, "track condition" is deleted.

Claim 4, line 64, "annual" is changed to --manual--.

Claim 9, line 17, after "adapter", --according-- is inserted.
line 18, "in" is changed to --means--.

Claim 11, line 31, "an" is changed to --and--
line 55, "of" is changed to --for--
line 56, after "said", --second-- is inserted.

Claim 13, line 63, "when" is changed to --with--.

Signed and sealed this 25th day of April 1972.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334